US012670747B2

(12) United States Patent

Mezaael

(10) Patent No.: US 12,670,747 B2
(45) Date of Patent: Jun. 30, 2026

(54) METHOD AND APPARATUS FOR VEHICLE-TUNED DIAGNOSTICS AND REPORTING

(71) Applicant: FORD GLOBAL TECHNOLOGIES, LLC, Dearborn, MI (US)

(72) Inventor: Abraham Mezaael, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 255 days.

(21) Appl. No.: 18/151,852

(22) Filed: Jan. 9, 2023

(65) Prior Publication Data

US 2023/0146411 A1 May 11, 2023

Related U.S. Application Data

(62) Division of application No. 16/025,495, filed on Jul. 2, 2018, now Pat. No. 11,551,487.

(51) Int. Cl.
*G07C 5/00* (2006.01)
*G07C 5/08* (2006.01)

(52) U.S. Cl.
CPC ........... *G07C 5/008* (2013.01); *G07C 5/0808* (2013.01); *G07C 5/085* (2013.01)

(58) Field of Classification Search
None
See application file for complete search history.

(56) References Cited

U.S. PATENT DOCUMENTS

| | | | | |
|---|---|---|---|---|
| 8,050,811 | B2 | 11/2011 | Inbarajan et al. | |
| 8,706,348 | B2 * | 4/2014 | Beams | G07C 5/085 701/32.7 |
| 8,892,310 | B1 | 11/2014 | Palmer et al. | |
| 9,299,198 | B2 | 3/2016 | Chronowski et al. | |
| 9,805,601 | B1 | 10/2017 | Fields et al. | |
| 9,972,209 | B1 | 5/2018 | Hayward | |
| 9,989,005 | B1 | 6/2018 | Silvestri et al. | |
| 10,373,257 | B1 | 8/2019 | Iqbal et al. | |
| 10,593,135 | B2 | 3/2020 | Noyelle | |
| 10,867,495 | B1 * | 12/2020 | Venetianer | G08B 13/19671 |
| 2005/0080606 | A1 * | 4/2005 | Ampunan | G08G 1/20 703/8 |
| 2005/0182534 | A1 | 8/2005 | Legate et al. | |

(Continued)

FOREIGN PATENT DOCUMENTS

| | | | |
|---|---|---|---|
| DE | 102015226147 | A1 | 6/2017 |

*Primary Examiner* — Christian Chace
*Assistant Examiner* — Scott R Jagolinzer
(74) *Attorney, Agent, or Firm* — Joseph Zane; Brooks Kushman P.C.

(57) ABSTRACT

A system includes a processor configured to detect an onboard request for vehicle-action reporting configuration. The processor is also configured to send a vehicle identifier to a configuration server, responsive to the request. The processor is further configured to receive a set of configuration data, representing tuned trigger variables for vehicle reporting, tuned to a vehicle identified by the identifier. Additionally, the processor is configured to use the configuration data to tune a set of vehicle reporting trigger variables, such that a reporting entity reports based upon occurrence of a tuned variable.

20 Claims, 3 Drawing Sheets

(56) References Cited

U.S. PATENT DOCUMENTS

| | | | | |
|---|---|---|---|---|
| 2006/0241817 | A1* | 10/2006 | Patenaude | B60R 25/33 701/1 |
| 2007/0026876 | A1* | 2/2007 | Freilich | G08G 1/20 455/461 |
| 2007/0276582 | A1 | 11/2007 | Coughlin | |
| 2011/0166739 | A1* | 7/2011 | Oesterling | G06Q 10/107 701/29.5 |
| 2013/0124052 | A1* | 5/2013 | Hahne | B60R 21/013 701/46 |
| 2013/0278405 | A1* | 10/2013 | Bacal | H04K 3/415 340/439 |
| 2013/0288659 | A1* | 10/2013 | Hrabak | H04W 52/0277 455/419 |
| 2015/0178578 | A1 | 6/2015 | Hampiholi | |
| 2015/0331686 | A1 | 11/2015 | Petersen et al. | |
| 2016/0031388 | A1 | 2/2016 | Grimm et al. | |
| 2016/0031389 | A1 | 2/2016 | Grimm et al. | |
| 2016/0039411 | A1* | 2/2016 | Park | B60W 30/09 701/70 |
| 2016/0210795 | A1 | 7/2016 | Shin et al. | |
| 2017/0039784 | A1 | 2/2017 | Gelbart et al. | |
| 2017/0069146 | A1* | 3/2017 | Sun | G07C 5/0808 |
| 2017/0103101 | A1* | 4/2017 | Mason | G06F 16/2365 |

* cited by examiner

METHOD AND APPARATUS FOR VEHICLE-TUNED DIAGNOSTICS AND REPORTING

CROSS-REFERENCE TO RELATED APPLICATIONS

This application is a division of U.S. application Ser. No. 16/025,495 filed Jul. 2, 2018, now U.S. Pat. No. 11,551,487, issued on Jan. 10, 2023, the disclosure of which is hereby incorporated in its entirety by reference herein.

TECHNICAL FIELD

The illustrative embodiments generally relate to methods and apparatuses for vehicle-tuned diagnostics and reporting.

BACKGROUND

Vehicles have a variety of onboard diagnostic reporting codes, which provide diagnostic data and state-indicators for various vehicle systems. With the volume and variety of information flowing over a vehicle controller area network (CAN) bus, many sources can put this information to good use.

This information used to be primarily used for vehicle diagnostics, where a mechanic or other technician would plug a device into an onboard diagnostic (OBD) port. The OBD port gave the device, typically a diagnostic tool, access to the CAN bus. The tool could then pull useful information off of the bus.

More recently, insurance companies and other services have begun to use OBD ports to access vehicle information. By recording and reporting a set of data from the bus, this can allow companies to determine how a particular vehicle is being used. These devices are typically set to observe a standard set of conditions, such as, for example, engine speed, vehicle speed, braking aggressiveness, etc.

The problem with these devices is that they do no accommodate different vehicle configurations. For example, while 4000 rpms might be excessive for a light duty truck, it is a common engine speed for a high-performance vehicle. Devices configured to record a standard set of data may read a high engine speed in a high-performance vehicle as "bad performance," when that speed is typical for such a vehicle and is not inappropriate use at all. But, in the interest of avoiding the cost and difficulty, if not impossibility, of individually configuring these devices, some companies using the devices have stuck to using a standard set of data, and have accepted this sort of error as an acceptable cost of doing business. This may cause drivers to avoid using the devices, however, unless they are driving a vehicle to which the "stock" device configuration is relevant.

SUMMARY

In a first illustrative embodiment, a system includes a processor configured to detect an onboard request for vehicle-action reporting configuration. The processor is also configured to send a vehicle identifier to a configuration server, responsive to the request. The processor is further configured to receive a set of configuration data, representing tuned trigger variables for vehicle reporting, tuned to a vehicle identified by the identifier. Additionally, the processor is configured to use the configuration data to tune a set of vehicle reporting trigger variables, such that a reporting entity reports based upon occurrence of a tuned variable.

In a second illustrative embodiment, a system includes a processor configured to detect a temporary vehicle situation predefined as corresponding to a vehicle data reporting trigger variance. The processor is also configured to obtain an adjusted variable value for adjusting a vehicle data reporting trigger variable. The processor is further configured to adjust a previous vehicle data reporting trigger variable value with the adjusted variable value and revert to an unadjusted previous vehicle data reporting trigger variable value upon detecting cessation of the temporary situation.

In a third illustrative embodiment, a system includes a processor configured to receive a vehicle identifier identifying a specific vehicle, including a requesting entity identification or request purpose. The processor is also configured to determine a set of vehicle data reporting trigger values predefined for the specific vehicle for reporting to the identified entity or for the request purpose. Further, the processor is configured to determine at least one aftermarket modification that applies to the specific vehicle. The processor is also configured to apply a variance, predefined for the aftermarket modification, to a trigger value that corresponds to the modification and respond to the vehicle identifier with the set of values including the varied trigger value.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
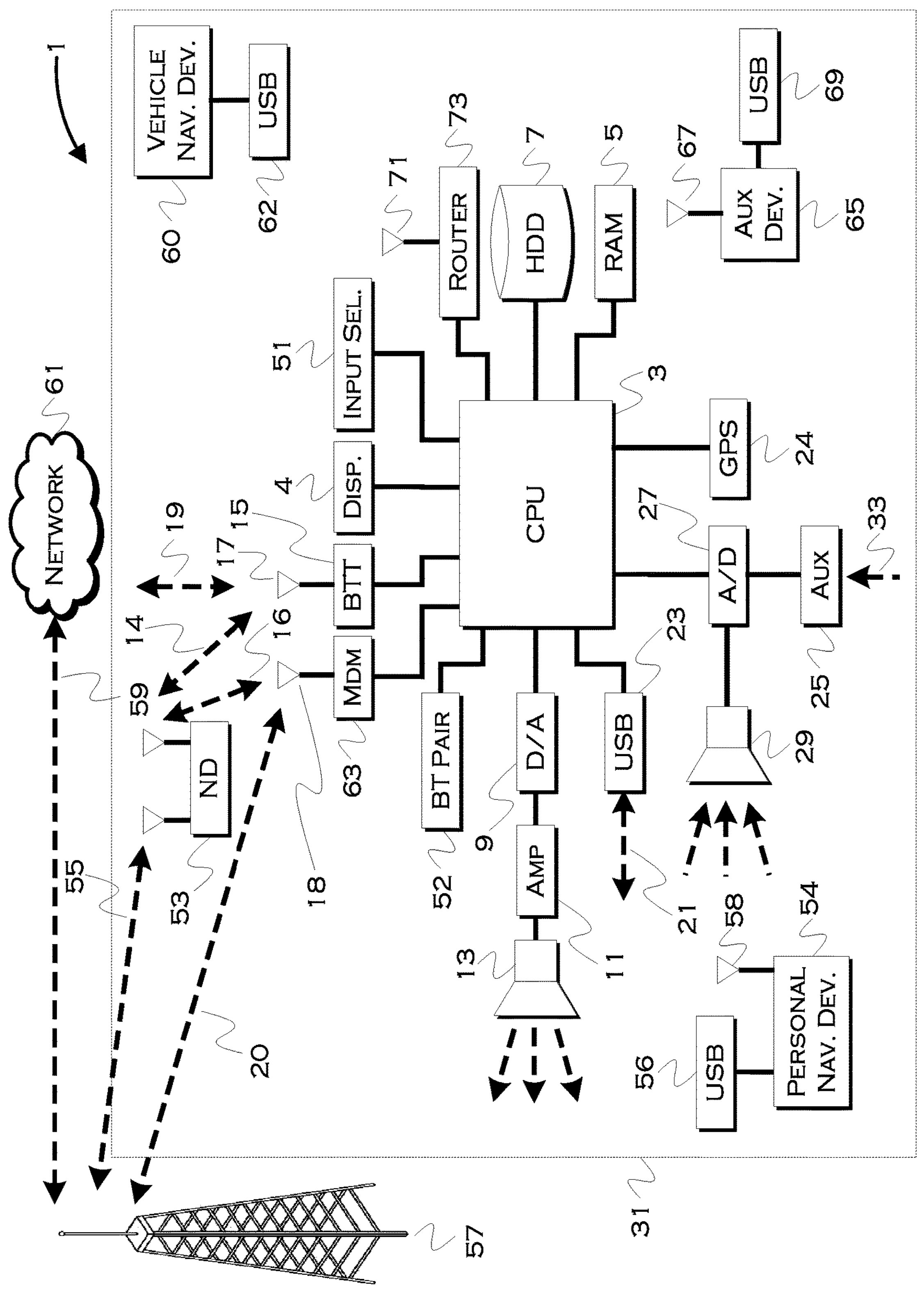
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While devices that track vehicle and driver performance data in real time may be useful, these devices do not accommodate variations in vehicle configuration, and thus the devices may treat certain performance variables as being inappropriate, even if those variables represent suitable behavior for a given vehicle make, model or configuration.

Further, vehicles often come equipped with advanced control systems, to be engaged when driving situations dictate. Again, the onboard devices do not recognize these repurposings, and thus may read performance under such modes as "bad behavior" or "bad driving habits."

For example, a light duty truck may normally not be operated at engine speeds in excess of 4000 rpms. This may be true for many vehicles, so a device-maker may install code to report data when engine speed exceeds 4000 rpms. For a performance sports car, this may be completely inappropriate, but the device may be vehicle-agnostic, and have no way of accommodating these changes. The device may also issue alerts at certain levels, which could become very annoying if a vehicle was frequently, but also appropriately, operated above a tolerance threshold.

In the truck example, the truck may have a "tow" setting, which can be engaged when towing heavy loads. This may keep the engine in a lower gear, and the engine may operate at higher speeds. If the "tow" setting is engaged, this could be completely appropriate behavior, but since the device has no way of knowing about the "tow" setting or accommodating the "tow" setting, the device may read all towing behavior as bad driving habits. This can cause a user to either stop using the vehicle for towing or stop using the device because of the perception (correctly observed) that the device does not accommodate intended use.

The illustrative embodiments allow for dynamic reconfiguration of the reporting settings for reporting diagnostic and other vehicle data. Reporting conditions can be set for individual vehicle makes, models and even configurations. Reporting conditions can also be varied based on feature engagement, allowing for one-off usage situations to be accommodated by the settings.

By allowing varied per-vehicle reporting settings that are dynamically updateable and configurable, based on, for example, changing perceptions of what is "safe" for a given vehicle, vehicle customizations and vehicle operating conditions (internal and external), the illustrative concepts and embodiments provide opportunities to improve the utility and functionality of diagnostic reporting systems. The novel, uncommon and atypical examples and concepts described herein demonstrate potential improvements achievable through use of those examples, concepts, and the like.

Figure 2:
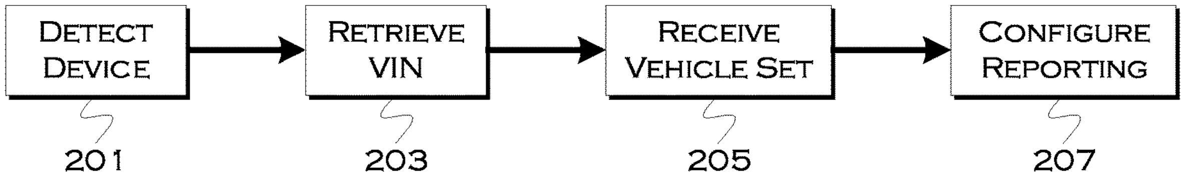
FIG. 2 shows an illustrative process for reporting configuration.

FIG. 2 shows an illustrative process for reporting configuration. In this example, the process will use a vehicle identifier, such as a vehicle identification number (VIN) or electronic serial number (ESN) to identify a specific vehicle. Since reporting can be tuned to vehicle characteristics, and since the process can use the identifier to determine if the vehicle has any of those tunable-related characteristics, the process can specify a certain set of reporting conditions, or, in other examples, a variable usable to modify a baseline.

In this example, the process detects 201 that a report gathering device has been installed in an onboard diagnostic (OBD) port. In other examples, the vehicle may be equipped with onboard reporting (as a native function) or the process can detect an application executing that is requesting reporting on vehicle states. Since applications and devices may need vehicle states for a variety of reasons, the reporting tool provider may elect to identify when reporting variables should be tunable. Once the process knows that a tunable set of variables is appropriate, the process can retrieve 203 a vehicle identifier. This identifier can identify stock vehicle characteristics or a specific vehicle. In the stock characteristics example, the process may not provide quite the same level of refinement, but the process should still be able to report off more reasonable, vehicle-tuned trigger variables, than it would if a simple, universal set of trigger variables was used.

The process may also gather other data, such as custom aftermarket parts. Since some of these may not have a way of electronically registering with a vehicle (e.g., upgraded brake pads), the process may be reliant on a mechanic or installer to update a vehicle record. In an alternative version, the user could input the aftermarket parts, if the user wanted those parts to be considered for reporting tuning purposes. Since the part record will be uploaded, the process may only have to receive this data once.

The process then sends 205 the identifier and any additional part information to the remote configuration server. In another example, the process may have a predefined variable library onboard, from which the process could retrieve variables associated with various configurations for tuning reporting. This could be initially installed or installed after a first request was sent to a remote server. In still another example, the process could have a set of modifiers stored onboard (or remotely retrieved), representing how baseline triggers should be modified based on a certain set of variables. Storing at least some information, representing changes to triggers when existing features are engaged, for example, can save time when those temporary features are engaged, but is not a necessity.

The process, in this example, receives 207 a set of vehicle trigger configurations, that represent appropriate reporting conditions based on the specific vehicle. In this example, the process may identify an entire set, but in another example the process could have sent an initial set of baseline triggers (as provided by the device or app builder), and then the process could have tuned or replaced those triggers, based on vehicle features and options, as well as make and model, and that tuned set could be returned. The process then uses the received tuned reporting variables to reconfigure 209 reporting conditions and/or triggers for recording or reporting data.

Figure 3:
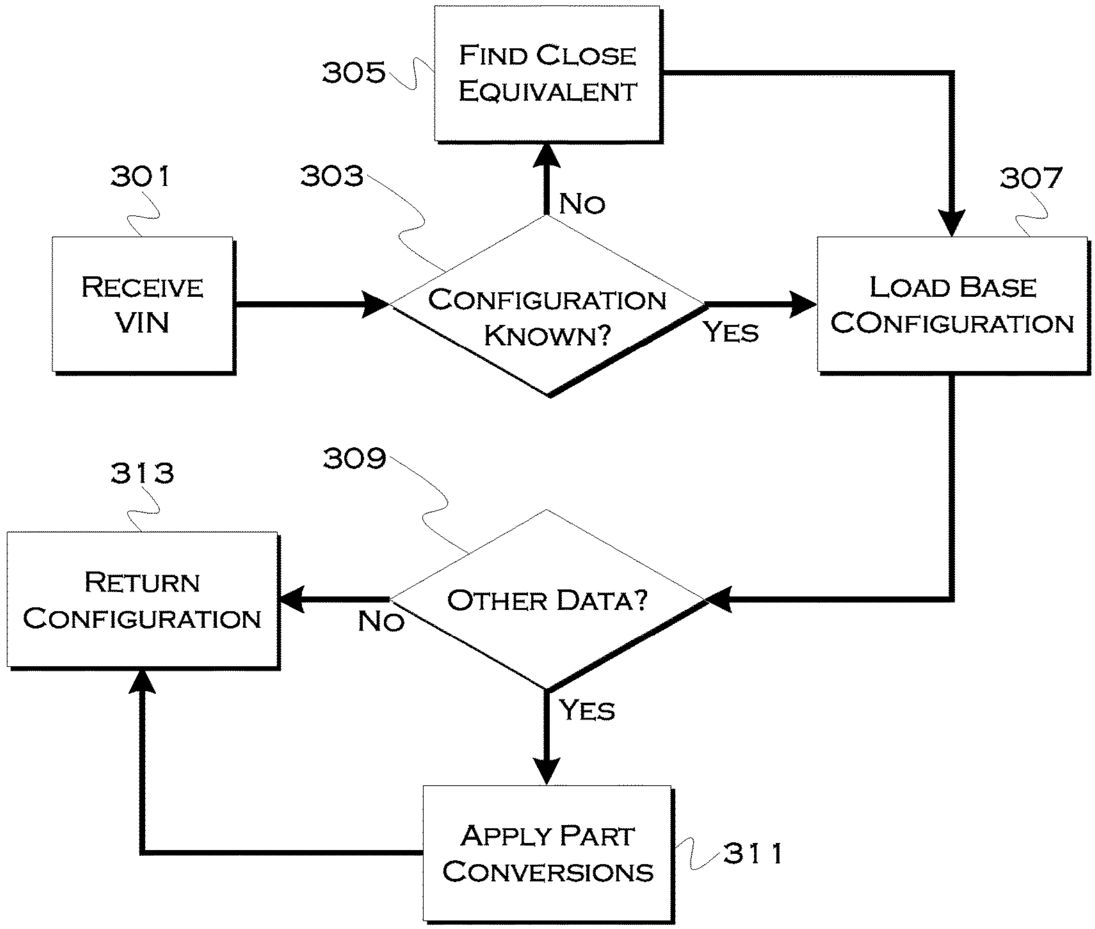
FIG. 3 shows an illustrative process for configuration customization.

FIG. 3 shows an illustrative process for configuration customization. In this example, the process receives 301 a vehicle identifier. This identifier identifies a vehicle make and model, or a specific vehicle for which make, model and other features/options can be retrieved. The process then may use the number to look up the vehicle, and determines 303 if a set of trigger variables is known for a current vehicle configuration. For example, if the vehicle is Model X and Make Y, the process may know the appropriate conversions or replacements for various reporting conditions, and the process may load 303 this base configuration. A request for the values may also include a purpose of the request (such as a category—e.g., safety, performance, etc.) or a requesting entity identification (e.g., an insurance device, an insurance company name, an application name, an application providing company, etc.).

If, though, the vehicle is Model $X_1$ and Make Y (representing a first option package, for example, including larger wheels), the process may not have a specific configuration for the larger wheels. In this instance, the process may choose 305 the closest projected equivalent vehicle (likely Model X Make Y) and use the base configuration for the closest known vehicle.

The process could also make a record of the fact that a potentially sub-optimal package was chosen, and if there is a data upgrade in the future to reflect data tuned to the specific option package, the remote server could push an update to the vehicle or wait for another request and then provide the newly tuned triggers included in a response. Thus, the process can continually improve reporting triggers so that users feel confident that any tracking or reporting reflects data considerations designed for a vehicle (or close equivalent to) that they are driving.

In some examples, there may be additional aftermarket options, and this may be indicated in the received vehicle identifier or obtained from a vehicle record determinable by the identifier. If there is 309 other data available, the process may apply 311 a part conversion for that data. Or, in some other examples, the process may select a replacement value for the part If conversion is used, the process can vary a wide set of numbers associated with multiple vehicles based on an incremental improvement achieved with a part. That is, since the vehicles do not all have the same tuned baseline variable (see the example of the truck and sports car above), simply replacing a number because of an aftermarket part (e.g., upgraded tires) may not be universally appropriate or achieve the best results (in some cases, it may). In some instances, the part may represent a modifier, which may modify the tuned value (e.g., adjust 2500 rpms to 2750 rpms based on a 1.1 modifier) and thus the modification based on the part may be applicable across various vehicles. This can help prevent a manufacturer from having to test every single aftermarket part on every single make and model of vehicle on which it can be installed, but may still achieve a reasonable improved tunable variable value when the aftermarket part is installed.

Once any modifications, if any, have been made, the process may return 313 the configuration. This configuration may also include, for example, variances to trigger values that should be used when a temporary vehicle feature is engaged. The process can know which features are available based on the vehicle identifier, and thus the configuration can include variable values for use when those features are engaged (see, for example, the preceding towing example).

Figure 4:
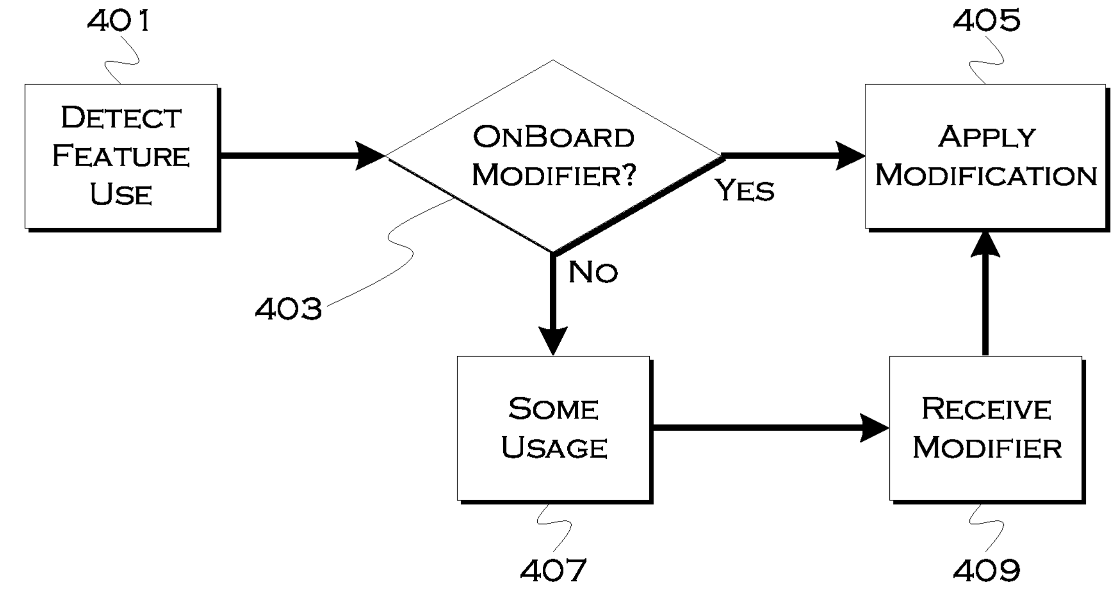
FIG. 4 shows an illustrative process for real-time configuration variation.

FIG. 4 shows an illustrative process for real-time configuration variation. In this example, the process may detect usage of a temporary feature, such as a varied traction control or engagement of a tow function designed to keep the engine in a lower gear, longer. The process detects 401 engagement of the user function. In current models, the reporting device may be completely ignorant of the function engagement and any affect that this might cause to vehicle system usage, and since the vehicle may behave in a somewhat atypical fashion, the device might report all of this behavior as aberrant behavior, even though it is completely appropriate and safe with the feature engaged.

If the process previously received override data (replacement data) or a modifier 403 when the trigger configuration data was received, the process may use that saved modification or replacement data to replace the typical trigger, responsive to the engagement of the feature. So, for example, if the towing was engaged, the process may replace RPM measurements with higher RPM measurements as suitable measurements, or at least corresponding to certain gears, in accordance with behavior expected and appropriate when towing a load with the tow feature engaged.

If the process lacks an onboard modifier, the process may send 407 the fact of the feature engagement to a remote server, requesting a modifier or replacement corresponding to the feature. Not all features will have modifiers, and some modifiers will only modify a limited number of trigger variables. If there is a modifier or replacement value for the engaged feature, the process receives 409 this modifier and applies the received replacement or trigger modifier.

Figure 5:
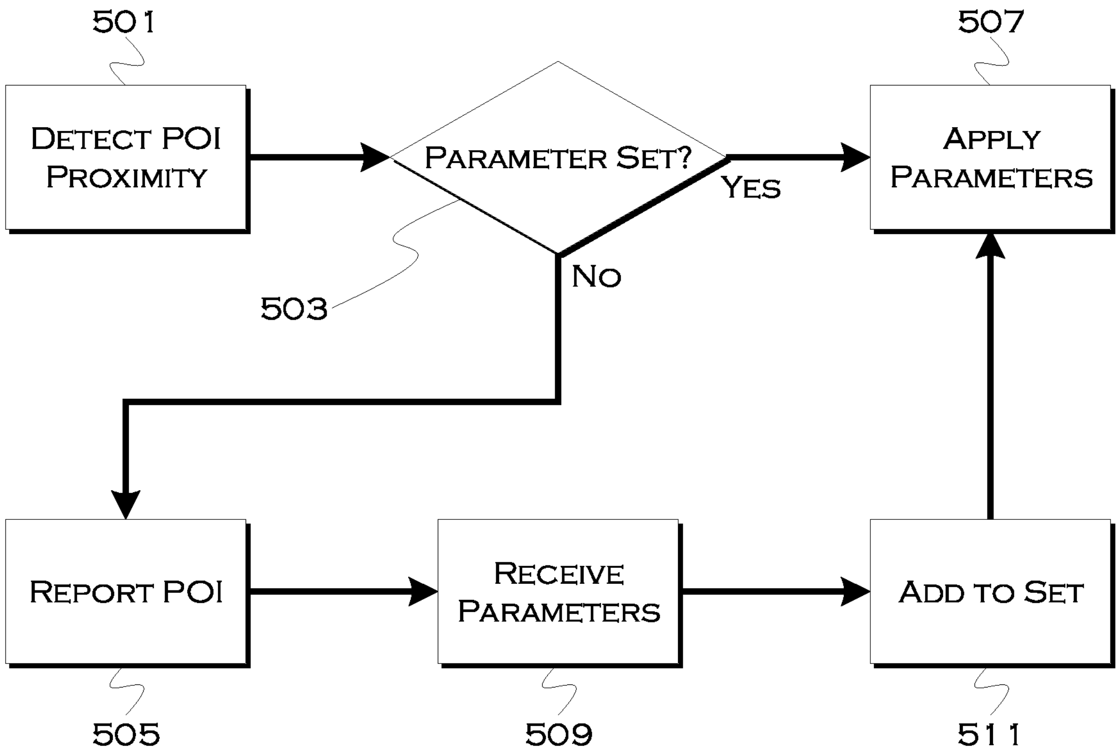
FIG. 5 shows an illustrative process for locality-based real-time configuration variation.

FIG. 5 shows an illustrative process for locality-based real-time configuration variation. In this example, the process will report a point of interest (POI) or POI type, in case certain behavior is expected or required in proximity to the POI. Parents could also set reporting conditions for child vehicles, for example, and the "reporting" trigger (that launches reporting in the first place) could be the presence of a certain key or mobile device in the vehicle. POIs can include virtually any permanent or temporary POI identifiable by the vehicle, and behavior can include things like limiting emission, limiting speed, lowering music, etc.

In this example, the process detects 501 proximity to a specific POI or a POI of a given type. The granularity of this detection can be triggered based on the data available, and in some instances geo-fences around areas (neighborhoods, schools, etc) may be used as a proxy for a POI. This is a mere example of the sort of dynamic trigger adjustment that can be enabled by the illustrative embodiments, by making variable values available, the process can adjust those values off of a variety of environmental external variables (e.g., road type, road conditions, weather, POI, etc) as well as internal variables (single passenger, multiple passengers, children present, etc).

In this example, the process detects the POI as a temporary situation, and the process has in indicator that POIs in general, or POIs of a type, or a specific POI, has an adjusted vehicle data reporting variable potentially associated therewith. For example, the process could be configured to report based on schools, a specific school, or anything classified as a government building.

The process also determines 503 if there is an onboard modification associated with the POI. The onboard modification could be included in a basic parameter set that is defined for common POIs, could be included in a set previously obtained for a particular POI or POI type, etc.

If there is a parameter set defined for a particular POI onboard, the process can apply a variance to one or more vehicle data reporting trigger values associated with that POI (e.g., exhaust type, speed, etc.) The variance or adjustment can include replacement of a trigger value or adjustment of a trigger value, as previously explained herein.

The processor can also send a request, reporting 505 the POI, to a remote server if there is no onboard adjustment. Not all POIs may require adjustment, and sometimes the adjustment may be tuned to timing (e.g., school-based adjustments may not apply on nights and weekends). If the process receives 509 a parameter set or variance responsive to sending the POI information, the process can add 511 the data to a local set (for later use if the POI or other temporary situation is again encountered) and the process can then adjust 507 the trigger variable(s) based on the value(s) or adjustment(s).

The illustrative embodiments allow for dynamic redefinition of vehicle data reporting trigger values, so that more accurate vehicle data reporting can be obtained. The data can be tuned to a vehicle and to situations, so that driver behavior can be tracked and modeled in a manner that more accurately reflects whether or not the behavior was optimal or desired.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A vehicle comprising:

a processor configured to:

detect a temporary vehicle situation, the temporary vehicle situation predefined as corresponding to a vehicle data reporting trigger variance that changes a condition for triggering a report from the vehicle about the occurrence of at least one detected, predefined vehicle system state, to a remote server;

obtain an adjusted variable value for adjusting a vehicle data reporting trigger variable, the adjusted variable value defined in conjunction with the temporary vehicle situation and defining a trigger value to be used as a predicate for the report while the temporary vehicle situation is detected;

adjust a previous vehicle data reporting trigger variable value with the adjusted variable value to create a temporary new predicate for reporting while the temporary vehicle situation is detected; and revert to the previous vehicle data reporting trigger variable value to a value of the previous vehicle data reporting trigger variable value prior to the adjustment upon detecting cessation of the temporary vehicle situation or when the temporary vehicle situation is no longer detected.

2. The vehicle of claim 1, wherein the temporary vehicle situation includes proximity to a specific point of interest.

3. The vehicle of claim 1, wherein the temporary vehicle situation includes proximity to a specific type of point of interest.

4. The vehicle of claim 1, wherein the temporary vehicle situation includes the vehicle being located within a geo-fenced zone.

5. The vehicle of claim 1, wherein the adjusted variable value is obtained from an onboard data set, onboard the vehicle.

6. The vehicle of claim 1, wherein the adjusted variable value is obtained via the processor being further configured to send situation-identifying information to a remote server and wherein the processor is further configured to receive the adjusted variable value from the remote server responsive to sending the information.

7. The vehicle of claim 1, wherein the temporary situation includes engagement of an engageable and disengagable feature of the vehicle.

8. The vehicle of claim 1, wherein the temporary situation is detected based on an environmental condition external to the vehicle.

9. The vehicle of claim 1, wherein the temporary situation is detected based on an environmental condition internal to the vehicle.

10. A non-transitory, machine-readable storage medium storing instructions that, when executed, cause a processor of a vehicle to perform a method comprising:

detecting a temporary vehicle situation, the temporary vehicle situation predefined as corresponding to a vehicle data reporting trigger variance that changes a condition for triggering at least storage of a report from the vehicle about the occurrence of at least one detected, predefined vehicle system state;

obtaining an adjusted variable value for adjusting a vehicle data reporting trigger variable, the adjusted variable value defined in conjunction with the temporary vehicle situation and defining a trigger value to be used as a predicate for the storage of the report while the temporary vehicle situation is detected;

adjusting a previous vehicle data reporting trigger variable value with the adjusted variable value to create a temporary new predicate for reporting while the temporary vehicle situation is detected; and reverting to the previous vehicle data reporting trigger variable value to a value of the previous vehicle data reporting trigger variable value prior to adjustment upon detecting cessation of the temporary vehicle situation or when the temporary vehicle situation is no longer detected.

11. The storage medium of claim 10, wherein the temporary vehicle situation includes proximity to a specific point of interest or a specific type of point of interest.

12. The storage medium of claim 10, wherein the temporary vehicle situation includes the vehicle being located within a geo-fenced zone.

13. The storage medium of claim 10, wherein the adjusted variable value is obtained from an onboard data set, onboard the vehicle or via the processor being further configured to: send situation-identifying information to a remote server and receive the adjusted variable value from the remote server responsive to sending the information.

14. The storage medium of claim 10, wherein the temporary situation includes engagement of an engageable and disengagable feature of the vehicle.

15. The storage medium of claim 10, wherein the temporary situation is detected based on an environmental condition.

16. A method comprising:

detecting a temporary vehicle situation, the temporary vehicle situation predefined as corresponding to a vehicle data reporting trigger variance that changes a condition for triggering at least storage of a report from the vehicle about the occurrence of at least one detected, predefined vehicle system state;

obtaining an adjusted variable value for adjusting a vehicle data reporting trigger variable, the adjusted variable value defined in conjunction with the temporary vehicle situation and defining a trigger value to be used as a predicate for the storage of the report while the temporary vehicle situation is detected;

adjusting a previous vehicle data reporting trigger variable value with the adjusted variable value to create a temporary new predicate for reporting while the temporary vehicle situation is detected; and reverting to the previous vehicle data reporting trigger variable value to a value of the previous vehicle data reporting trigger variable value prior to adjustment upon detecting cessation of the temporary vehicle situation or when the temporary vehicle situation is no longer detected.

17. The method of claim 16, wherein the temporary vehicle situation includes proximity to a specific point of interest or a specific type of point of interest.

18. The method of claim 16, wherein the temporary vehicle situation includes the vehicle being located within a geo-fenced zone or is detected based on an environmental condition.

19. The method of claim 16, wherein the adjusted variable value is obtained from an onboard data set, onboard the vehicle or via the processor being further configured to: send situation-identifying information to a remote server and receive the adjusted variable value from the remote server responsive to sending the information.

20. The method of claim 16, wherein the temporary situation includes engagement of an engageable and disengagable feature of the vehicle.

* * * * *